United States Patent
Salesse-Lavergne (10) Patent No.: US 9,573,675 B2
(45) Date of Patent: Feb. 21, 2017

(54) METHOD AND SYSTEM FOR ENGAGING HOVERING FLIGHT FOR A ROTARY WING AIRCRAFT, ENABLING IT TO MAINTAIN EITHER TRACK OR HEADING DEPENDING ON ITS FORWARD SPEED

(71) Applicant: AIRBUS HELICOPTERS, Marignane (FR)

(72) Inventor: Marc Salesse-Lavergne, Allauch (FR)

(73) Assignee: AIRBUS HELICOPTERS, Marignane (FR)

( * ) Notice: Subject to any disclaimer, the term of this patent is extended or adjusted under 35 U.S.C. 154(b) by 32 days.

(21) Appl. No.: 14/750,739

(22) Filed: Jun. 25, 2015

(65) Prior Publication Data
US 2015/0375851 A1 Dec. 31, 2015

(30) Foreign Application Priority Data

Jun. 30, 2014 (FR) .................................. 14 01479

(51) Int. Cl.
*B64C 13/18* (2006.01)
*G05D 1/08* (2006.01)
(Continued)

(52) U.S. Cl.
CPC ............... *B64C 13/18* (2013.01); *B64C 27/04* (2013.01); *G05D 1/0858* (2013.01); *G05D 1/102* (2013.01)

(58) Field of Classification Search
CPC ........... B64C 13/18; B64C 27/04; G05D 1/02; G05D 1/08
(Continued)

(56) References Cited

U.S. PATENT DOCUMENTS 5,001,646 A   3/1991 Caldwell et al.
5,213,283 A   5/1993 Gold et al.
(Continued)

FOREIGN PATENT DOCUMENTS

EP   0455580   11/1991
EP   0601122   3/1997
(Continued)

OTHER PUBLICATIONS

French Search Report for French Application No. FR 1401479 Completed by the French Patent Office on Apr. 24, 2015, 11 Pages.
(Continued)

*Primary Examiner* — Tan Q Nguyen
(74) *Attorney, Agent, or Firm* — Brooks Kushman P.C.

(57) ABSTRACT

A method and a system for engaging hovering flight for a rotary wing aircraft. A first mode of operation makes it possible, while the longitudinal speed $U_X$ of the aircraft is greater than a first threshold speed $V_{thresh1}$ to approach a stop position S while maintaining track relative to the ground, the flight setpoints of an autopilot being a ground course angle $TK_{sol}$, a deceleration rate Ga for the forward speed Va of the aircraft, a flight path angle P, and a heading $\Psi$. A second mode of operation makes it possible, when the longitudinal speed $U_X$ is less than a second threshold speed $V_{thresh2}$, to engage hovering flight at the stop position S while maintaining heading, the flight setpoints being the longitudinal speed $U_X$, a lateral speed $V_Y$, a vertical speed $W_Z$, and the heading $\Psi$, the speeds $U_X$, $V_Y$, and $W_Z$ being reduced progressively to zero speed.

16 Claims, 1 Drawing Sheet (51) Int. Cl.
*G05D 1/10* (2006.01)
*B64C 27/04* (2006.01)
*G05D 1/02* (2006.01)

(58) Field of Classification Search
USPC .................. 701/11, 4, 7; 244/17.13, 7 A
See application file for complete search history.

(56) References Cited

U.S. PATENT DOCUMENTS

| | | | |
|---|---|---|---|
| 6,070,829 | A | 6/2000 | Bellera et al. |
| 6,259,975 | B1 | 7/2001 | Rollet et al. |
| 6,622,065 | B2 | 9/2003 | Mezan |
| 7,427,046 | B2 | 9/2008 | Bellera |
| 8,392,037 | B2 | 3/2013 | Sahasrabudhe et al. |
| 8,788,123 | B2 | 7/2014 | Salesse-Lavergne et al. |
| 8,840,057 | B2 | 9/2014 | Moret |
| 8,977,412 | B2 | 3/2015 | Certain |
| 8,989,921 | B2 * | 3/2015 | Nannoni .............. G05D 1/0858 701/1 |
| 2011/0036954 | A1 * | 2/2011 | Piasecki .................. B64C 3/385 244/7 A |
| 2012/0153074 | A1 * | 6/2012 | Nannoni .............. G05D 1/0858 244/17.13 |

FOREIGN PATENT DOCUMENTS

| | | |
|---|---|---|
| EP | 1607327 | 12/2005 |
| EP | 2574546 | 4/2013 |
| EP | 2597035 | 5/2013 |
| FR | 1347243 | 12/1963 |
| FR | 2756252 | 5/1998 |
| FR | 2777535 | 10/1999 |
| FR | 2814433 | 3/2002 |
| FR | 2991664 | 12/2013 |
| WO | 9305461 | 3/1993 |
| WO | 9534029 | 12/1995 |
| WO | 9955582 | 11/1999 |
| WO | 9964942 | 12/1999 |
| WO | 2012096668 | 7/2012 |
| WO | 2012134447 | 10/2012 |
| WO | 2012134460 | 10/2012 |
| WO | 2013012408 | 1/2013 |

OTHER PUBLICATIONS

French Search Report for French Application No. FR 1401470, Completed by the French Patent Office on Apr. 14, 2015, 5 Pages.
French Search Report for French Application No. FR 1401474 Completed by the French Patent Office on Apr. 24, 2015, 11 Pages.
Restriction Requirement for U.S. Appl. No. 14/750,726, Completed by the United States Patent and Trademark Office on Nov. 28, 2016, 6 pages.
Non-Final Office Action for U.S. Appl. No. 14/750,731, Completed by the United States Patent and Trademark Office on Nov. 4, 2016, 14 pages.

* cited by examiner

METHOD AND SYSTEM FOR ENGAGING HOVERING FLIGHT FOR A ROTARY WING AIRCRAFT, ENABLING IT TO MAINTAIN EITHER TRACK OR HEADING DEPENDING ON ITS FORWARD SPEED

CROSS REFERENCE TO RELATED APPLICATION

This application claims priority to French patent application No. FR 14 01479 filed on Jun. 30, 2014, the disclosure of which is incorporated in its entirety by reference herein. This application is related to U.S. application Ser. No. 14/750,726 entitled "A Flight Control System And Method With Track Maintenance For A Rotary Wing Aircraft" filed on Jun. 25, 2015 and U.S. application Ser. No. 14/750,731 entitled "A Flight Control System And Method For A Rotary Wing Aircraft, Enabling It To Maintain Either Track Or Heading Depending On Its Forward Speed" filed on Jun. 25, 2015.

BACKGROUND OF THE INVENTION (1) Field of the Invention

The present invention lies in the field of flight control systems for rotary wing aircraft, and more particularly the field of providing assistance in using flight controls, such as an autopilot.

The present invention relates to a method for engaging hovering flight for a rotary wing aircraft enabling it to maintain either track or heading depending on its longitudinal forward speed, and it thus forms a "full envelope" flight control method, i.e. a method that covers not only flight stages close to the ground and at low speed, but also flight stages at high altitudes and at high speed. The present invention also relates to a system for engaging hovering flight for a rotary wing aircraft enabling it to maintain either track or heading depending on its longitudinal forward speed.

(2) Description of Related Art

Rotary wing aircraft are aircraft that differ from other powered aircraft mainly by their ability to travel not only in cruising flight at high speeds, but also at low speeds or while hovering. This capacity is made available by using at least one main rotor of the aircraft, which rotor has an axis of rotation that is substantially vertical.

The main rotor constitutes a rotary wing providing the aircraft with lift and possibly also with propulsion. The behavior of the rotary wing aircraft in flight can be modified by varying the cyclic pitch and/or the collective pitch of the blades of the rotary wing. A variation in the cyclic pitch of the blades modifies the behavior of the aircraft in terms of attitude, and more particularly in pitching and/or in roll. A variation in the collective pitch of the blades leads to a modification in the behavior of the aircraft in terms of lift, making it possible in particular to generate movements along an axis that is substantially vertical, and also along its pitching and roll axes, depending on the attitude of the aircraft.

A rotary wing aircraft can also be maneuvered in yaw, even while stationary, by using a yaw anti-torque device. For example, such an anti-torque device is formed by a tail rotor having an axis of rotation that is substantially horizontal and located at the rear of the aircraft. Such a tail rotor has a plurality of blades, and as a general rule it is only the collective pitch of the blades that can be varied, even though it is also possible for the cyclic pitch to be variable.

A rotary wing aircraft generally has a single main rotor and a single anti-torque tail rotor. Nevertheless, a rotary wing aircraft may also have two contrarotating main rotors, e.g. in tandem or else on the same axis, in which case no anti-torque device is necessary.

Furthermore, a hybrid helicopter is a rotary wing aircraft having at least one main rotor that serves mainly to provide it with lift and to a smaller extent with propulsion, and at least one specific propulsion means such as a propulsive propeller. Such a hybrid helicopter enables large distances to be covered while traveling at a high forward speed. The anti-torque device of such a hybrid helicopter may be formed by at least one of its propulsive propellers. Such a propulsive propeller has a plurality of blades and as a general rule only their collective pitch is variable.

Furthermore, a rotary wing aircraft may have aerodynamic elements such as stabilizers, or even wings, particularly in hybrid helicopters. These aerodynamic elements may have moving parts and they can participate in making the aircraft maneuverable, in particular in cruising flight at high forward speeds.

The flight behavior of a rotary wing aircraft can be varied by modifying various flight parameters of the aircraft. These flight parameters include in particular cyclic and/or collective pitch values for the main rotors and the collective pitch value for the anti-torque rotor and/or the propulsion means, and the aerodynamic elements, if any. These flight parameters can be modified in this way in various control modes. In a manual control mode the pilot of the rotary wing aircraft has control levers that the pilot of the aircraft moves manually in order to vary the flight parameters, and in particular the cyclic and/or collective pitch of the blades of the various rotors by means of manual control linkages. The concept of "manual" should be considered in opposition to the concept of "automatic", without prejudice to the means used by a person for maneuvering the aircraft, which means may in particular be pedals, a control stick, or a joystick.

In an embodiment of a manual control mode, control levers engage respective linkages for mechanically transmitting forces remotely, so as to enable the pilot of the rotary wing aircraft to act mechanically on the blades by using control levers, either directly, or else via servo-controls.

In another embodiment of a manual control mode, the pilot moving a control lever serves to generate electrical signals for activating at least one servo-control for moving the blades.

In an automatic control mode, an autopilot generates control signals for those flight parameters and in particular for varying the pitch of the blades of the various rotors by using automatic control linkages. When the autopilot is activated, the control signals take the place of the control signals generated by the pilot acting directly on the control levers for activating the servo-controls.

The autopilot enables the rotary wing aircraft to maintain stable progress in application of previously stored flight setpoints. The actual state of progress of the aircraft is evaluated by the autopilot at a given instant by means of information supplied by a variety of instrumentation on board the aircraft. On the autopilot detecting a difference between the flight setpoints and the actual state of progress of the aircraft, the autopilot acts on the flight behavior of the rotary wing aircraft by means of one or more flight parameters in order to re-establish its actual state of progression in compliance with the flight setpoints.

The pilot of the rotary wing aircraft activates the autopilot by using one or more specific control buttons.

In a stabilization mode performed by the autopilot, an initial setpoint for maintaining the attitude of the rotary wing aircraft may, for example, be defined relative to the state of progression of the aircraft as evaluated from activation of the autopilot. Stabilization mode serves to stabilize the aircraft by the autopilot correcting the attitude of the aircraft relative to the initial setpoint.

In a particular mode of piloting by transparency, the pilot may possibly intervene temporarily on the behavior of the aircraft by using control levers and overriding the control signals generated by the autopilot. The initial flight setpoints are unaffected, any temporary intervention by the pilot on the behavior of the aircraft not leading to any modification to the initial flight setpoints.

It is also known to correct a flight setpoint, such as a setpoint for maintaining attitude, as a function of the actual state of progression of the rotary wing aircraft after the pilot has acted on the control levers. It is also known to enable the pilot of the aircraft to correct an attitude maintaining setpoint by varying the value of that setpoint incrementally, the pilot making use of one or more dedicated control members. For example, two control members may be used of the kind commonly known as "beeps". For example, such control members may be positioned respectively on a collective pitch control lever and on a cyclic pitch control lever generally referred to as a "stick".

Document FR 1 347 243 describes a device for piloting by transparency that enables the pilot to take action either with a return to the initial flight setpoints after the pilot's action ceases or else with new flight setpoints being stored that take account of the action of the pilot.

Also known is Document FR 2 991 664, which describes an automatic system for providing piloting assistance that enables a flight parameter to be maintained on a progression axis of the aircraft while taking account of the action of the aircraft pilot on at least one other axis by using flight control levers while the autopilot of the aircraft is in operation. Various modes of guidance can be selected by the pilot, e.g. giving priority to maintaining a vertical speed or a forward speed or indeed maintaining heading, angle of attack, or flight path angle.

Furthermore, Document U.S. Pat. No. 5,001,646 describes an automatic control system enabling the pilot to act on the progression of the aircraft by means of a four-axis control member. The pilot can then control longitudinal, lateral, and vertical accelerations of the aircraft and also its angular speed in yaw, while conserving firstly, at low forward speed, a speed relative to the ground that is independent of the heading being followed, and secondly, at high forward speed, a coordinated turn and a flight path angle.

The rotary wing aircraft is stabilized using basic modes, in which, by way of example, the autopilot generates an increase in stability by damping angular movements of the aircraft, or indeed it serves to maintain attitude or heading. The basic modes provide piloting comfort for the pilot of the rotary wing aircraft, but they do not correct for potential differences relative to the speed or position the pilot desires for the aircraft. Proposals have thus been made to associate higher modes of operation with the basic modes in order to eliminate potential differences in position, speed, and/or acceleration of the aircraft compared with the values desired by the pilot. These desired values are input in the form of flight setpoints that the higher autopilot modes use for bringing the aircraft to the desired position, speed, and/or acceleration, and for maintaining it. The operation of stabilizing the aircraft obtained using the basic modes is performed quickly by the autopilot, whereas the operation of re-establishing position, speed, and/or acceleration of the rotary wing aircraft is performed subsequently and more slowly by the higher modes.

By way of example, Document WO 95/34029 describes a flight control system for an aircraft enabling the speeds of the aircraft to be stabilized by operating the controls relative to the yaw, roll, and pitching axes and also relative to lift, while maintaining a heading that is constant.

The autopilot can also provide advanced functions of assisting in the guidance of the rotary wing aircraft. The possibilities made available by the higher modes are also used to obtain such assistance. The ways in which advanced functions are executed depend on predefined capabilities of the autopilot relating to the setpoint track that is to be followed by the aircraft.

Specifically, such higher autopilot modes are designed to perform instrument flight rules (IFR) operations, i.e. for piloting that can be performed solely with the assistance of flight instruments and can thus be performed with degraded vision outside the aircraft, or indeed with no outside vision.

In contrast, visual flight rules (VFR) operations are performed when the pilot can control the aircraft by looking outside the aircraft and not only with the help of instruments and flight assistance.

By way of example, the setpoint track as used for a flight mission may be determined by the pilot of the rotary wing aircraft, or else during a stage of approaching a site that is known and identified. Such a site is provided in particular with means providing interactivity between the site and the autopilot, such as radio navigation beacons. In the absence of such interactive equipment, the site is identified by the pilot of the aircraft in manual mode, and then the pilot of the aircraft activates the desired advanced functions.

The operating capabilities of the autopilot make it possible to provide automatic piloting assistance by correcting the attitude of the rotary wing aircraft in cruising flight, at high forward speeds, and when the aircraft is in a position that is remote from the ground. In a stage of cruising flight, the surroundings of the aircraft are normally empty and the pilot of the aircraft does not need to pay sustained attention to the maneuvering of the aircraft. The pilot can also avoid such sustained attention close to the ground in surroundings that are known by making use of an advanced function of the autopilot, such as during a stage of approaching a landing ground that is known and/or provided with means for identifying its surroundings.

Likewise, during a stage of approaching an intervention site that is known to the autopilot and that has been recognized and identified, activation of an advanced function is made possible, even at low speeds, for guiding the rotary wing aircraft along the corresponding setpoint track.

In addition, like a person piloting an aircraft, the autopilot conventionally controls the longitudinal, lateral, and vertical speeds of the aircraft respectively by the longitudinal cyclic pitch, the lateral cyclic pitch, and the collective pitch of the main rotor, and the collective pitch of an anti-torque rotor controlling the orientation of the aircraft about its yaw axis. These longitudinal, lateral, and vertical speeds are defined in a reference frame tied to the aircraft having axes that are formed by the longitudinal, lateral, and vertical directions of the aircraft.

Furthermore, an autopilot can also enable the aircraft to perform coordinated turns. A coordinated turn is a turn performed without the aircraft drifting from the turn track relative to the ground, which is ground coordination, or else without any lateral load factor, which is air coordination.

With ground coordination, a turn is coordinated relative to the ground. The aircraft does not drift relative to the ground, thus enabling it to follow a ground track accurately. Such a turn that is coordinated relative to the ground is preferably used at low speed and low altitude so as to move safely in the proximity of terrain in relief or buildings, with the nose of the aircraft generally remaining in alignment with the ground track.

With air coordination, a turn is coordinated relative to the air. The aircraft does not drift relative to the air, thereby giving preference to the comfort of its occupants and minimizing the sideslip of the aircraft. Such a turn that is coordinated relative to the air is preferably used in cruising flight, i.e. at high speed and high altitude, and far away from any obstacles.

Document U.S. Pat. No. 5,213,283 describes a control system for performing a coordinated turn. That control system automatically supplies a yaw control signal in response to the pilot issuing a banking control signal while making such a coordinated turn, with the pilot's workload thus being reduced.

In addition, Document WO 2012/134447 describes a flight control system for an aircraft enabling a coordinated turn to be performed throughout the flight envelope, thereby minimizing the pilot's workload. At high speed, that control system makes use firstly of changes in the angle of attack of the aircraft to control heading and also lateral acceleration, and secondly of the air speed of the aircraft for controlling heading, so as to perform a coordinated turn relative to the air. At low speed, the control system makes use of the sideslip angle of the aircraft in order to maintain the heading in alignment with the track of the aircraft, thus performing a coordinated turn relative to the ground. In a transition zone between those two flight envelopes, the sideslip angle of the aircraft and its lateral acceleration are used to maintain the aircraft in a coordinated turn.

Furthermore, rotary wing aircraft are powered aircraft designed to be capable of flying in a variety of conditions that can sometimes be difficult, both in terms of atmospheric conditions, such as the presence of a strong wind and varying visibility conditions, and in terms of flight conditions, such as flying at low speeds or hovering, or indeed conditions involving the surroundings, such as being close to ground that is unknown or poorly known.

In difficult flight conditions, the pilot of the rotary wing aircraft is likely to need to take account of unexpected factors. It can then be awkward, or even impossible, for the pilot of the aircraft to make use of automatic assistance in maneuvering the aircraft under such difficult flying conditions. For example, when the aircraft is close to the ground, it must be possible for any change in its behavior to be implemented quickly. When the autopilot is using an advanced function implementing its higher modes of operation, it has difficulty in implementing a rapid modification to a track that is to be followed by the aircraft.

Under such difficult flying conditions, the use of IFR piloting can be dangerous and VFR piloting is to be preferred, but the pilot can nevertheless make use of assistance and/or certain instruments of the aircraft. Such conditions include in particular visual meteorological conditions (VMC) and degraded visual environment (DVE) conditions. The pilot may then find it necessary to make frequent adjustments to the speed and/or the track of the aircraft in order to avoid possible obstacles and in order to approach particular positions, e.g. if there is a strong side wind.

Document FR 2 777 535 describes a flight control system for an aircraft that makes it possible in particular to control lateral speed relative to the ground while maintaining a constant heading, e.g. for the purpose of compensating a strong side wind. That control system also makes it possible to maintain a constant direction for the speed of the aircraft, and thus for its track, while changing its heading and/or its longitudinal speed.

Furthermore, Document WO 2012/134460 describes a flight control system for an aircraft that makes it possible at a low speed to maintain a track that is constant relative to the ground while changing heading. The control system acts on the pitching and roll controls in order to maintain the track, with the pilot being able to cause the aircraft to move in rotation at any moment by means of those controls.

Likewise, Document WO 2012/096668 describes a flight control system for an aircraft that makes it possible to control the vertical speed of the aircraft, its flight path angle relative to the ground, and/or a height relative to the ground depending on its forward speed. Below a predetermined forward speed threshold, corresponding to a flight situation close to hovering, the flight control system makes it possible to maintain a height relative to the ground. Above that predetermined forward speed threshold, the flight control system then enables a vertical speed of the aircraft to be maintained or else it enables a flight path angle relative to the ground to be maintained.

Furthermore, Document FR 2 814 433 describes a flight control device for an aircraft in which an action on a control member can have different effects depending on the speed in translation of the aircraft. Thus, if this speed in translation of the aircraft is less than or equal to a predetermined threshold, an action on the control member acts directly on the speed in translation. In contrast, if the speed in translation of the aircraft is greater than the predetermined threshold, then an action on the control member acts, by way of example, on the acceleration in translation of the aircraft, or indeed on its angular speed.

Furthermore, Document WO 2013/012408 describes a flight control system for an aircraft that makes it possible automatically for the aircraft to engage hovering flight starting from forward flight, and also enables a position to be maintained in hovering flight.

Finally, the technological background of the field of the invention includes the following documents: WO 99/55582; EP 1 607 327; WO 93/05461; EP 2 574 546; and EP 0 455 580.

BRIEF SUMMARY OF THE INVENTION

An object of the present invention is thus to provide a method for engaging hovering flight and a system for engaging hovering flight that make it possible for a rotary wing aircraft to maintain track or to maintain heading depending on its longitudinal speed $U_X$, while avoiding the above-mentioned limitations.

According to the invention, a method for engaging hovering flight for enabling a rotary wing aircraft to maintain track or to maintain heading is for use in a rotary wing aircraft having at least one control member that is provided jointly with a plurality of movement axes A, B, C, D and an autopilot that generates control signals in predefined modes of operation and depending on flight setpoints.

The aircraft is characterized by three preferred directions, a longitudinal direction X extending from the rear of the aircraft towards the front of the aircraft, an elevation direction Z extending upwards perpendicularly to the longitudinal direction X, and a transverse direction Y extending from left to right perpendicularly to the longitudinal and elevation directions X and Z. The longitudinal direction X is the roll axis of the aircraft, the transverse direction Y is its pitching axis, and the elevation direction Z is its yaw axis.

The aircraft has at least one rotary wing provided with a plurality of main blades of pitch that is variable collectively and cyclically about respective pitch axes, enabling the aircraft to perform movements in rotation about those directions X, Y, Z and movements in translation along those directions X, Y, Z. The control signals from the autopilot can give rise to these movements of the aircraft in rotation and/or in translation relative to the directions X, Y, Z.

The method for engaging hovering flight is remarkable in that a first mode of operation of the control members and of the autopilot is applied when the longitudinal speed $U_X$ of the aircraft is greater than a first threshold speed $V_{thresh1}$, the autopilot then enabling the aircraft to approach a determined stop position S when the method is being applied while maintaining track relative to the ground, the flight setpoints of the autopilot being a ground course angle $TK_{sol}$, a deceleration rate Ga of the forward speed Va, a flight path angle P, and a heading $\Psi$, and a second mode of operation of the control members and of the autopilot is applied when the longitudinal speed $U_X$ is less than a second threshold speed $V_{thresh2}$, the autopilot then enabling the aircraft to engage hovering flight while maintaining heading towards this stop position S, the flight setpoints of the autopilot being the longitudinal speed $U_X$, a lateral speed $V_Y$, a vertical speed $W_Z$, and a heading $\Psi$. Furthermore, the first threshold speed $V_{thresh1}$ is greater than the second threshold speed $V_{thresh2}$.

The longitudinal speed $U_X$ of the aircraft is a projection of the forward speed Va of the aircraft onto the longitudinal direction X.

The rotary wing aircraft has at least one rotary wing with an axis of rotation that is substantially vertical, i.e. parallel to the elevation direction Z, and it may be built with a variety of architectures. By way of example, the aircraft may have a single rotary wing formed by a main rotor providing the aircraft with lift and propulsion, together with an anti-torque tail rotor having an axis of rotation that is substantially horizontal, i.e. parallel to the transverse direction Y. The anti-torque tail rotor also serves to perform maneuvers about the yaw axis.

In another example, the aircraft has two rotary wings formed by two contrarotating main rotors that may either be in tandem or else on the same axis. The aircraft may also have at least one rotary wing, such as a main rotor, providing the aircraft mainly with its lift, and one or more propulsive propellers having axes of rotation that are substantially horizontal, i.e. parallel to the longitudinal direction X and serving to provide the aircraft with propulsion. Such an aircraft then constitutes a hybrid helicopter.

In addition, a rotary wing aircraft may include aerodynamic elements such as stabilizers or wings, in particular in hybrid helicopters. Such aerodynamic elements may include movable portions in order to facilitate maneuvering the aircraft, in particular in cruising flight.

Whatever the architecture of the aircraft, the pilot of the aircraft can modify the behavior in flight of the aircraft by acting on one or more control levers that serve to vary the cyclic pitch and/or the collective pitch of the main blades of each rotary wing, and also control means such as pedals for varying the collective pitch of the secondary blades of a tail rotor, or indeed a joystick for varying the collective pitch of the secondary blades of at least one propulsive propeller. Likewise, if aerodynamic elements are present on the aircraft, the pilot of the aircraft may also cause their moving portions to move in order to modify the behavior in flight of the aircraft.

Furthermore, the autopilot may also modify the behavior in flight of the aircraft by means of control signals that it supplies and in compliance with the flight setpoints, so as to cause variations in the cyclic pitch and/or the collective pitch of the main blades of each rotary wing, variation in the collective pitch of the secondary blades of a tail rotor or indeed of at least one propulsive propeller, and also movements of the moving portions of aerodynamic elements if there are any present.

These pitch variations and these movements of moving portions serve to generate movements in rotation and/or translation of the aircraft relative to the directions X, Y, Z or variations in the angular and/or linear speeds of the aircraft relative to the same directions X, Y, Z. These movements in rotation and in translation of the aircraft take place in a reference frame tied to the aircraft and formed by the directions X, Y, Z.

The aircraft also travels along a track $T_{sol}$ that is determined relative to the ground in order to reach a destination on the ground, such as a landing ground, or else a hovering flight destination position. It is considered that the aircraft travels along a track $T_{sol}$ when its center of gravity follows the track $T_{sol}$. The track $T_{sol}$ is defined in a terrestrial geographical reference frame, i.e. a reference frame that is stationary relative to the terrestrial globe and in which the aircraft can move. By way of example, this terrestrial geographical reference frame is formed from cardinal points, e.g. the directions north and east, and also a vertical direction such as the terrestrial gravity direction.

The flight of an aircraft along the track $T_{sol}$ can be characterized, in a first type of characterization, by a ground course angle $TK_{sol}$ measured relative to the direction of magnetic north or of geographical north, in a horizontal plane of the terrestrial geographical reference frame, a forward speed Va, a flight path angle P, and a heading $\Psi$. The forward speed Va of the aircraft is its speed along the direction of the track $T_{sol}$. The forward speed Va may be the forward speed of the aircraft relative to the ground or the forward speed of the aircraft relative to the air.

The forward speed of the aircraft relative to the ground is generally used as the forward speed Va when flying at low altitudes, i.e. when the aircraft is close to obstacles such as terrain in relief and buildings. In contrast, the forward speed of the aircraft relative to the air is used as the forward speed Va essentially during cruising flight at high altitudes, i.e. when the aircraft is remote from any obstacle.

In addition, this forward speed Va may vary with an acceleration or deceleration rate Ga that can also serve to characterize the track $T_{sol}$ as a replacement for this forward speed Va in this first type of characterization.

The flight path angle P of the aircraft is the angle formed between the direction of the track $T_{sol}$ and a horizontal orientation of the terrestrial reference frame in which the track $T_{sol}$ is defined, i.e. relative to a plane perpendicular to the vertical direction formed by the terrestrial gravity direction.

The heading $\Psi$ of the aircraft is the angle formed between the north direction and the projection onto the horizontal plane of the terrestrial reference frame of the longitudinal direction X of the aircraft. Thus, when the heading $\Psi$ and the ground course angle $TK_{sol}$ are equal, the nose of the aircraft is pointing along the track $T_{sol}$. As a result, the longitudinal direction X is in alignment with the track $T_{sol}$. Otherwise, the nose of the aircraft does not lie on the track $T_{sol}$ and the track $T_{sol}$ is then not in alignment with the longitudinal direction X, it being understood that a rotary wing aircraft possesses the ability to advance in any direction independently of its own longitudinal direction X.

The flight of an aircraft along the track $T_{sol}$ can also be characterized, in a second type of characterization, by a speed along the three preferred directions X, Y, Z of the aircraft, i.e. a longitudinal speed $U_X$ in the longitudinal direction X, a lateral speed $V_Y$ in the transverse direction Y, and a vertical speed $W_Z$ in the elevation direction Z, and also by the heading $\Psi$. These longitudinal, lateral, and vertical speeds $U_X$, $V_Y$, and $W_Z$ are the components of the forward speed of the aircraft along those three preferred directions X, Y, Z of the aircraft, and preferably of the forward speed of the aircraft relative to the ground.

This second type of characterization of the track $T_{sol}$ is linked directly with the capabilities of an aircraft to move in rotation about the directions X, Y, Z and in translation along the directions X, Y, Z. A rotary wing aircraft generally has at least a first control lever, also known as a "stick", for modifying the cyclic pitch of a main rotor, and a second control lever that enables the collective pitch of the main rotor to be modified. The first control lever has two movement axes thus making it possible to control simultaneously movements in rotation of the aircraft about the longitudinal and transverse directions X and Y, and consequently to act on the longitudinal and lateral speeds $U_X$ and $V_Y$ of the aircraft. The second control lever has a single movement axis and serves to control movements in translation of the aircraft along the elevation direction Z, and consequently to act on the vertical speed $W_Z$ of the aircraft.

Furthermore, such a rotary wing aircraft generally has pedals enabling an anti-torque device to be controlled, e.g. by modifying the collective pitch of an anti-torque tail rotor, thus serving to control the yaw angle of the aircraft, and consequently its heading $\Psi$.

When such an aircraft has aerodynamic elements with moving portions, it may also have control means enabling movements of those moving portions to be controlled and consequently enabling the attitudes of the aircraft to be modified in order to act on the longitudinal, lateral, and vertical speeds $U_X$, $V_Y$, and $W_Z$ of the aircraft. Movements of these moving portions may also be coupled to the first and second levers.

This second type of characterization of the track $T_{sol}$ is particularly suitable for the aircraft flying at a very low forward speed while guaranteeing that the heading $\Psi$ of the aircraft is maintained so as to travel with constant exposure to the wind and so as to minimize any changes to the visual references seen by the aircraft pilot. This second type of characterization of the track $T_{sol}$ may be used in particular in special circumstances such as maintaining a hovering position, or moving around a hovering position, or indeed winching from a moving boat. Directly controlling the longitudinal, lateral, and vertical speeds $U_X$, $V_Y$, and $W_Z$ of the aircraft without changing the heading $\Psi$ of the aircraft makes it possible to fly close to a winching target or a landing target, and to adjust easily the position of the aircraft relative to such a target, e.g. by moving laterally or vertically. Independently modifying the heading $\Psi$ makes it possible to select a heading that gives the aircraft a desired exposure to the wind or desired visibility of the target, and then to maintain the heading $\Psi$ while performing subsequent speed adjustments.

The first type of characterization of the track $T_{sol}$ is more adapted to cruising flight at high altitude by guaranteeing that the track $T_{sol}$ is maintained in order to modify directly the course angle $TK_{sol}$ independently of the forward speed Va and the flight path angle P, or else to modify only the forward speed Va, or indeed only the flight path angle P. Under such circumstances, in response to the pilot of the aircraft controlling movement around the roll axis, the nose of the aircraft turns to remain in alignment with the track $T_{sol}$ being followed by the aircraft, thus making it easier to follow the track $T_{sol}$ while limiting or even eliminating the discomfort created by the aircraft banking in roll. Nevertheless, this first type of characterization of the track $T_{sol}$ can also be used during a low altitude flight in order to approach a target such as a landing ground along the track $T_{sol}$.

In contrast, the first type of characterization of the track $T_{sol}$ is not tied directly and simply to the movement capacities of the aircraft. When the pilot seeks to modify one or more parameters of this first type of characterization of the track $T_{sol}$, the pilot cannot act directly on the ground course angle $TK_{sol}$, the forward speed Va, the flight path angle P, or the heading $\Psi$. In general, the pilot needs to act simultaneously on a plurality of flight parameters including the collective and cyclic pitches of the main blades of at least one main rotor and possibly also the collective pitch of a tail rotor or of at least one propulsive propeller, or indeed the movement of at least one moving portion of an aerodynamic element. In addition, it is practically impossible for the pilot acting manually on the flight parameters to modify only one of these parameters of the track $T_{sol}$ without at least one other parameter of the track $T_{sol}$ also being modified. Furthermore, depending on the architecture of the rotary wing aircraft, it is possible to modify at least one of these parameters of the track $T_{sol}$ by acting equally well on several flight parameters of the aircraft.

For example, it is possible to modify the forward speed Va of a hybrid helicopter or else the acceleration or deceleration rate Ga of this forward speed Va by acting either on the propulsive propellers or on the main rotor. In contrast, if the heading $\Psi$ of the aircraft is different from its ground course angle $TK_{sol}$, then acting solely on the propulsive propellers or on the main rotor will modify the forward speed Va, and also the ground course angle $TK_{sol}$.

Thus, the flight of an aircraft along a track $T_{sol}$ can be characterized by these two types of characterization, either by a ground course angle $TK_{sol}$, a forward speed Va, or else the acceleration or deceleration rate Ga of this forward speed Va, a flight path angle P, and a heading $\Psi$, or else by a longitudinal speed $U_X$, a lateral speed $V_Y$, a vertical speed $W_Z$, and a heading $\Psi$.

The method of the invention for engaging hovering flight makes it possible to switch between the first mode of operation of the control members and of the autopilot using a first type of characterization of the track $T_{sol}$, and the second mode of operation of the control members and of the autopilot using the second type of characterization of the track $T_{sol}$, with switching between modes being a function of the longitudinal speed $U_X$ of the aircraft. This second mode of operation of the control members and of the autopilot is thus used at low forward speeds Va, while the first mode of operation is used at higher forward speeds Va.

Thus, when the longitudinal speed $U_X$ is greater than the first threshold speed $V_{thresh1}$, the autopilot enables the aircraft to approach a determined stop position S when the method is being applied while maintaining track relative to the ground, with the flight setpoints of the autopilot then being the ground course angle $TK_{sol}$, the forward speed Va or else the deceleration rate Ga of this forward speed Va, the flight path angle P, and the heading $\Psi$. In contrast, when the longitudinal speed $U_X$ is less than the second threshold speed $V_{thresh2}$, the autopilot enables the aircraft to engage hovering flight while maintaining heading towards this stop position S, with the flight setpoints of the autopilot then being the longitudinal speed $U_X$, the lateral speed $V_Y$, the vertical speed $W_Z$, and the heading $\Psi$.

Nevertheless, causing the aircraft to travel along a flight path angle P has meaning only above a certain forward speed, specifically of about 20 knots (kt). When the forward speed Va of the aircraft is less than a third threshold speed $V_{thresh3}$, typically equal to 20 kt, but while still in the speed range for maintaining track, the piloting of the aircraft may be performed with the flight setpoint that corresponds to the flight path angle P being replaced by a flight setpoint that corresponds to the vertical speed $W_Z$.

The stop position S is determined as a function of the track $T_{sol}$ followed by the aircraft and as a function of the parameters of this track $T_{sol}$. This stop position S is thus in alignment on the track $T_{sol}$ and determined as a function of the forward speed Va and the flight path angle P of the aircraft and also of a predetermined deceleration rate for the forward speed Va.

The forward speed Va needs to be reduced until it becomes zero in order to achieve hovering flight. This forward speed Va is reduced at a deceleration rate Ga that serves to obtain a compromise between effectiveness and comfort, and depending on the capabilities of the aircraft. The forward speed Va thus varies and decreases at this deceleration rate Ga when approaching the stop position S while maintaining track. The deceleration rate Ga of this forward speed Va is preferably used as one of the flight setpoints of the autopilot of the aircraft instead of and replacing the forward speed Va.

The flight setpoints corresponding to the longitudinal, lateral, and vertical speeds $U_X$, $V_Y$, and $W_Z$ also vary and decrease with respective deceleration rates when engaging hovering flight while maintaining heading towards the stop position S.

The deceleration rate Ga of the forward speed Va may lie in a predefined range. For example, this deceleration rate Ga may lie in the range 0.25 meters per second per second (m/s$^2$) to 1.15 m/s$^2$, with a nominal value of 0.7 m/s$^2$.

The stop position S is determined when the pilot engages the hovering method of the invention, this engagement of the hovering method being obtained by the pilot acting on activation means, e.g. by pressing once or twice on a dedicated button.

In addition, the stop position S may be represented on display means of the aircraft, such as a screen arranged on the instrument panel or head-up viewing means. The pilot can thus view the stop position S relative to the surroundings and possibly relative to the target position for the hovering. This stop position S may be displayed on the display means of the aircraft prior to engaging the hovering method in order to inform the pilot of the aircraft where the aircraft will come to a stop.

Nevertheless, when the aircraft is close to this stop position S, e.g. on entering a stage of flight while maintaining heading, it may be preferable not to display the stop position S. The stop position S might then be superposed on other symbols of the display means of the aircraft and could lead to confusion for the pilot of the aircraft. This stage of flying while maintaining heading comes into effect at 20 meters (m) from the stop position S, for example.

In addition, switching between the first and second modes of operation of the control members and of the autopilot is performed relative to a threshold with hysteresis by using threshold speeds $V_{thresh1}$ and $V_{thresh2}$ with the first threshold speed $V_{thresh1}$ being greater than the second threshold speed $V_{thresh2}$.

The term "threshold with hysteresis" is used to mean a set of thresholds in which the setpoint for activating a system is different from its setpoint for stopping it. Such a threshold with hysteresis has a high threshold and a low threshold that are different. The presence of these two thresholds serves essentially to avoid an excessive number of consecutive activations or stops. In the method of the invention, the high threshold is the first threshold speed $V_{thresh1}$ and the low threshold is the second threshold speed $V_{thresh2}$.

Thus, the first mode of operation of the control members and of the autopilot is engaged as soon as the longitudinal speed $U_X$ exceeds the first threshold speed $V_{thresh1}$ and it remains engaged so long as the longitudinal speed $U_X$ is greater than or equal to the second threshold speed $V_{thresh2}$. Likewise, the second mode of operation of the control members and of the autopilot is engaged as soon as the longitudinal speed $U_X$ becomes less than the second threshold speed $V_{thresh2}$, and it remains engaged so long as the longitudinal speed $U_X$ is less than or equal to the first threshold speed $V_{thresh1}$.

In addition, the threshold speeds $V_{thresh1}$ and $V_{thresh2}$ may be functions of the flying conditions of the aircraft, essentially the longitudinal speed of the wind to which the aircraft is subjected and the lateral speed $V_Y$ of the aircraft.

Depending on the speed and on the direction of the relative wind to which the aircraft is subjected, the nose of the aircraft may be in alignment with the track $T_{sol}$ of the aircraft or it may be turned towards the direction of the wind. For example, at low longitudinal speed $U_X$, a pilot preferably maintains the nose of the aircraft in alignment with the wind direction if the wind is strong so as to avoid having a cross-wind in order to limit the power consumed by the tail rotor of the aircraft and/or in order to limit the aircraft taking on a roll attitude, which can be very uncomfortable for the occupants of the aircraft. In contrast, at the same low longitudinal speed $U_X$, the pilot will align the nose of the aircraft on the track $T_{sol}$ of the aircraft when the wind is light and will keep the nose in the direction of the wind when the wind is strong. Making these thresholds depend on the projection of the wind on the longitudinal axis of the aircraft thus makes it possible to approximate the actions that a pilot would perform naturally.

Advantageously, in order to avoid the aircraft traveling with a large amount of side wind, the method of the invention makes use of the first and second threshold speeds $V_{thresh1}$ and $V_{thresh2}$ that are variable depending on the longitudinal wind speed to which the aircraft is subjected for the purpose of switching over to piloting while maintaining heading earlier on, i.e. while the longitudinal speed $U_X$ of the aircraft is high.

The longitudinal speed of the relative wind to which the aircraft is subjected is used to mean the projection onto the longitudinal direction X of the speed of this relative wind to which the aircraft is subjected. By convention, it is considered that a longitudinal speed of the relative wind to which the aircraft is subjected is positive when the aircraft is facing the wind and that such a longitudinal speed of the wind is negative when the aircraft has its tail to the wind.

For example, with a head wind at a speed of less than 20 kt, the first threshold speed $V_{thresh1}$ is equal to 5 kt and the second threshold speed $V_{thresh2}$ is equal to 7 kt. For a head wind having speed lying in the range 20 kt to 40 kt, the first threshold speed $V_{thresh1}$ is equal to 8 kt and the second threshold speed $V_{thresh2}$ is equal to 10 kt.

Furthermore, if the lateral speed $V_Y$ of the aircraft is less than or equal to 20 kt, no multiplying coefficient is applied to the threshold speeds $V_{thresh1}$ and $V_{thresh2}$. In contrast, if the lateral speed $V_Y$ of the aircraft is greater than 20 kt, a multiplying coefficient may be applied to the threshold speeds $V_{thresh1}$ and $V_{thresh2}$. This multiplying coefficient may for example be equal to 1.5 when the lateral speed $V_Y$ is 40 kt.

Furthermore, the pilot may need to modify the stop position S manually or may need to adjust the track $T_{sol}$ whether in cruising flight or in low altitude flight. In particular, the pilot can modify this stop position S as determined when engaging the hovering method in order to adjust this stop position S and make it coincide with the target position for hovering. This adjustment of the stop position S may be performed using the display means and the representation of the stop position S, in particular while the aircraft is still far away from this stop position S. Thereafter, any adjustment to this stop position S ends up being made at sight by the pilot. Furthermore, when flying at sight and at low altitude, the pilot can adjust the track $T_{sol}$ as a function of the surroundings and/or of weather conditions, in order to fly close to buildings or to terrain in relief, or indeed in order to avoid a building or else terrain in relief, e.g. while being subjected to a strong wind, such as a side wind, that can have an influence on the maneuvers of the aircraft.

Advantageously, the method of the invention enables the pilot to modify the stop position S and to act directly on the parameters characterizing the track $T_{sol}$ by transparency by using control members for the purpose of modifying these parameters characterizing the track $T_{sol}$.

As a result, in the first mode of operation of the control members and of the autopilot, it is possible by transparency to control the parameters of the track $T_{sol}$, as specified in the first type of characterization for the track $T_{sol}$, so as to cause the aircraft to follow a new track $T_{soln}$.

After each pilot action on at least one control member relative to the movement axes A, B, C, D, the aircraft travels along a new track $T_{soln}$ that is characterized in the first type of characterization, by a new ground course angle $TK_{soln}$, a new deceleration rate $Ga_n$ for the forward speed Va, a new flight path angle $P_n$, and/or a new heading $\Psi_n$, in order to approach a new stop position $S_n$ determined on the basis of the old stop position S and the actions of the pilot.

It is thus possible by transparency to cause the deceleration rate Ga of the forward speed Va to vary so as to modify the forward speed Va independently of the ground course angle $TK_{sol}$ and of the flight path angle P, by taking a first action relative to a first movement axis A of a control member and by means of the autopilot. The stop position S is then moved along the track $T_{sol}$ with the distance between the aircraft and the stop position S being modified. An increase in the deceleration rate Ga thus reduces this distance between the aircraft and the stop position S, whereas a decrease in the deceleration rate Ga increases this distance.

It is likewise possible by transparency to cause the stop position S to be modified by modifying the ground course angle $TK_{sol}$ independently of the forward speed Va and of the flight path angle P, by taking a second action relative to a second movement axis B of a control member and by means of said autopilot. The stop position S is then shifted in a horizontal plane, with the track $T_{sol}$ being modified. The stop position S then moves substantially along a circular arc centered on the current position of the aircraft.

For example, starting from a stage of stabilized flight during which the aircraft flies along a track $T_{sol}$ having the stop position S thereon, a lateral action by the pilot on a control member, corresponding to this second action, modifies the setpoint for the ground course angle $TK_{sol}$ and consequently leads to a modification to the track $T_{sol}$ of the flight. So long as the pilot maintains this lateral action, the new stop position $S_n$ is modified and its position moves on the display means of the aircraft. Thereafter, when the pilot interrupts this lateral action, the aircraft settles down, the setpoint for the ground course angle $TK_{sol}$ ceases to vary and a new ground course angle $TK_{soln}$ constitutes a flight setpoint. The new stop position $S_n$ thus ceases to move and stabilizes in line with the new track $T_{soln}$ corresponding to this new ground course angle $TK_{soln}$.

Finally, it is possible by transparency to cause the altitude of the stop position S to be modified by modifying the flight path angle P or the vertical speed $W_Z$, where appropriate, independently of the forward speed Va and of the ground course angle $TK_{sol}$, by taking a third action relative to a third movement axis C of a control member and by means of said autopilot. The stop position S is then moved vertically, with only its altitude being modified, this stop position S still lying on the track $T_{sol}$.

For example, the new stop position $S_n$ is determined by extending the new flight path angle $P_n$ and while taking account firstly of a small amount of anticipation to allow for variation of the flight path angle P ceasing after the pilot ceases to apply the third action, and secondly of a short curved path for leveling off the aircraft on reaching the new stop position $S_n$ and hovering in this new stop position $S_n$.

Furthermore, the pilot acting relative to a fourth movement axis D of a control member also enables a parameter of the track $T_{sol}$ of the aircraft to be modified. For example, the heading $\Psi$ may be modified by taking an action relative to this fourth movement axis D.

Furthermore, the heading $\Psi$ may be modified directly by the pilot of the aircraft acting on the pedals conventionally present in an aircraft. In addition, this heading $\Psi$ has no effect on the track $T_{sol}$ followed by the aircraft and, consequently, it has no effect on the stop position S in the context of the aircraft flying while maintaining track, the direction of the track $T_{sol}$ being defined by the ground course angle $TK_{sol}$.

Consequently, the pilot acting relative to a fourth movement axis D of a control member can enable some other parameter of the track $T_{sol}$ of the aircraft to be modified. Preferably, an action of the pilot relative to this fourth movement axis D makes it possible to modify the ground course angle $TK_{sol}$ and, consequently, to modify the stop position S, the pilot thus having two options for modifying this ground course angle $TK_{sol}$ by means of two movement axes B and D.

Advantageously, using these two movement axes B and D to act on the ground course angle $TK_{sol}$ only enables the pilot to have greater flexibility in modifying both the stop position S and the ground course angle $TK_{sol}$, e.g. using either hand, thereby making it easier to string together maneuvers and/or modifications to the parameters of the track $T_{sol}$ of the aircraft.

Thus, taking an action on a control member relative to at least one of the movement axes A, B, C, D makes it possible, by means of the autopilot acting on the various flight parameters, to modify respectively the deceleration rate Ga of the forward speed Va, the ground course angle $TK_{sol}$, and the flight path angle P or else the vertical speed $W_Z$ where appropriate, and consequently the stop position S. Taking such actions relative to the movement axes A, B, C then modifies the flight setpoints supplied to the autopilot, which generates command orders in order to perform the pilot's request. For this purpose, the autopilot may act on one more flight parameters of the aircraft, such as the collective pitch and the cyclic pitch of the main blades of a main rotor, the collective pitch of the secondary blades of a tail rotor, or indeed of at least one propulsive propeller, or possibly movements of the moving portions of aerodynamic elements if present on the aircraft, in order to obtain this modification of a single parameter of the track $T_{sol}$ in the first type of characterization.

The flight setpoints of the autopilot are synchronized during this first mode of operation of the control members and of the autopilot, and on each action taken by the pilot on a control member, on the parameters of the new track $T_{soln}$, and on the new stop position $S_n$, with these flight setpoints being the new ground course angle $TK_{soln}$, the new deceleration rate $Ga_n$ for the forward speed Va, the new flight path angle $P_n$, or indeed the new vertical speed $W_{Zn}$, where appropriate, and/or the new heading $\Psi_n$.

Furthermore, the flight setpoint corresponding to the flight path angle P or else to the vertical speed $W_Z$, where appropriate, may also be variable, so that the aircraft approaches this new stop position $S_n$ by means of the autopilot.

Thus, the control method of the invention for hovering enables the pilot to modify both the track $T_{sol}$ followed by the aircraft and the stop position S by acting directly on the parameters of the track $T_{sol}$ while maintaining track in the first type of characterization and enables the autopilot to follow automatically the new track $T_{soln}$ as selected by the pilot in order to approach the new stop position $S_n$.

Nevertheless, the heading $\Psi$ may be modified without the pilot acting directly on the heading $\Psi$ in the event of the pilot acting on a control member in cruising flight in order to modify the ground course angle $TK_{sol}$ or the forward speed Va.

For example, during particular flying conditions, essentially in strong wind, certain limiting angles between the longitudinal direction X and the track $T_{sol}$ can lead to flight that is uncomfortable for the occupants or even dangerous. In particular, aligning the longitudinal direction X of the aircraft with its track $T_{sol}$ in the presence of a strong side wind can lead to such particular conditions.

In these particular flight conditions, the heading $\Psi$ can be modified by the autopilot during variations in the ground course angle $TK_{sol}$ or in the forward speed Va so as to avoid reaching such limiting angles.

Consequently, the flight setpoints of the autopilot are synchronized on the parameter of the track $T_{sol}$ that was modified by this action of the pilot, i.e. the new ground course angle $TK_{soln}$ or the new deceleration rate $Ga_n$ of the forward speed Va and the new heading $\Psi_n$, so that the aircraft is caused to follow the newly-obtained track $T_{soln}$ by means of the autopilot.

Likewise, a modification to the heading $\Psi$ made by the pilot, e.g. by transparency by acting on the pedals of the aircraft, through an amplitude that might lead to such limiting angles in order to attempt to maintain the aircraft on the initial track, can lead to the ground course angle $TK_{sol}$ being corrected by the autopilot specifically for the purpose of ensuring that these limiting angles are not reached and consequently giving rise to a modification of the stop position S.

Once more, the flight setpoints of the autopilot are synchronized on the new heading $\Psi_n$ and optionally on the new ground course angle $TK_{soln}$ of the new track $T_{soln}$ so that the aircraft follows the newly-obtained track $T_{soln}$ by means of the autopilot and approaches the new stop position $S_n$.

Naturally, the pilot may also act simultaneously on a plurality of movement axes A, B, C, D, the autopilot then generating command orders in order to modify the parameters of the track $T_{sol}$ and the stop position S as requested by the pilot without modifying the other parameters of the track $T_{sol}$.

Furthermore, during the second mode of operation of the control members and of the autopilot, it is possible independently and by transparency, to cause the parameters of the track $T_{sol}$ in the second type of characterization of the track $T_{sol}$ to be modified so that said aircraft follows a new track $T_{soln}$ and engages hovering while maintaining heading pointing towards the new stop position $S_n$.

It is thus possible, by transparency, to cause the stop position S to move longitudinally by taking a first action relative to a first movement axis A of a control member and by means of the autopilot. Likewise, it is possible, by transparency, to cause the stop position S to move laterally by taking a second action relative to a second movement axis B of a control member and by means of said autopilot, and it is also possible to cause the stop position S to move vertically by taking a third action relative to a third movement axis B of the control member and by means of said autopilot.

Furthermore, an action of the pilot relative to a fourth movement axis D of a control member makes it possible to modify the heading $\Psi$ of the aircraft, thereby having a direct effect on the forward direction of the aircraft if heading is being maintained, as contrasted to track being maintained. If the aircraft has at least one longitudinal, lateral, or vertical speed $U_X$, $V_Y$, or $W_Z$ that is not zero, each modification to the heading $\Psi$ modifies the directions X, Y, Z relative to a terrestrial reference frame and consequently the directions of the longitudinal, lateral, and vertical speeds $U_X$, $V_Y$, and $W_Z$ also change, as does the stop position S.

In contrast, it is possible to distinguish two situations in the second mode of operation of the control members and of the autopilot, depending on whether the aircraft is already hovering or whether it is approaching the stop position S.

When the aircraft is hovering at the stop position S, the longitudinal, lateral, and vertical speeds $U_X$, $V_Y$, and $W_Z$ and also the corresponding flight setpoints are zero. Thus, taking an action on a control member relative to the movement axes A, B, C, D makes it possible by means of the autopilot acting on the various flight parameters to move the aircraft to the new stop position $S_n$ in response to the request of the pilot. Such an action relative to one of these movement axes A, B, C, D temporarily modifies the flight setpoints supplied to the autopilot, which then generates command orders so as to cause the aircraft to move in this way to the new stop position $S_n$. Thereafter, the flight setpoints corresponding to the longitudinal, lateral, and vertical speeds $U_X$, $V_Y$, and $W_Z$ are once more zero. In contrast, the heading $\Psi$ can be modified without affecting the stop position S, with the aircraft having speeds $U_X$, $V_Y$, and $W_Z$ that are zero, the setpoint corresponding to the heading $\Psi$ being synchronized on a new heading $\Psi_n$.

In contrast, when the aircraft is approaching the stop position S, at least one of the longitudinal, lateral, and/or vertical speeds $U_X$, $V_Y$, and $W_Z$ and also at least one of the corresponding flight setpoints are not zero but are decreasing towards values of zero. Taking an action on a control member relative to at least one of the movement axes A, B, C, D then enables the autopilot to modify respectively and independently the longitudinal, lateral, and vertical speeds $U_X$, $V_Y$, and $W_Z$ and also the heading $\Psi$, and consequently enables the stop position S to be modified. Such an action relative to one of these movement axes A, B, C, D then modifies the flight setpoints supplied to the autopilot in order to satisfy the pilot's request using new longitudinal, lateral, and vertical speeds $U_{Xn}$, $V_{Yn}$, and $W_{Zn}$, and/or a new heading $\Psi_n$. These corresponding flight setpoints are likewise variable and they decrease towards values of zero in order to engage hovering towards the new stop position $S_n$.

Furthermore, it is difficult, if not impossible, to act manually to keep an aircraft at a speed that is exactly zero, regardless of whether that speed is the longitudinal speed $U_X$, the lateral speed $V_Y$, or the vertical speed $W_Z$. Once the longitudinal, lateral, and/or vertical speeds $U_X$, $V_Y$, and/or $W_Z$ has an absolute value that is small and less than a fourth threshold speed $V_{thresh4}$, it can be considered that the pilot is seeking to maintain this new speed at zero and that the corresponding flight setpoint should be zero. By way of example, this fourth threshold speed $V_{thresh4}$ may be equal to 0.25 m/s.

It is also possible to use slightly different thresholds for these speeds $U_X$, $V_Y$, and $W_Z$, for example a horizontal fourth threshold speed $Vh_{thresh4}$ for the longitudinal speed $U_X$ and for the lateral speed $V_Y$, and a vertical fourth threshold speed $Vv_{thresh4}$ for the vertical speed $W_Z$.

For example, when the longitudinal, lateral, and vertical speeds $U_X$, $V_Y$, and $W_Z$ are less than this fourth threshold speed $V_{thresh4}$, the aircraft is in a flying situation close to hovering, and the method of the invention then serves to hold a stop position S stationary relative to the ground.

Thus, the control method of the invention for engaging hovering flight enables the pilot to modify the stop position S of the aircraft by acting directly on the parameters of the track $T_{sol}$ while maintaining heading in the second type of characterization, and enables the autopilot automatically to follow the new track $T_{soln}$ selected by the pilot in order to approach this new stop position $S_n$ or to move the aircraft if it is already hovering.

Naturally, the pilot in this second mode of operation may also act simultaneously on a plurality of movement axes A, B, C, D, with the autopilot generating command orders in order to modify the stop position S as requested by the pilot without modifying other parameters of this track $T_{sol}$.

Advantageously, the method of the invention thus makes it possible to fly the aircraft automatically to a stop position S while allowing piloting by transparency, in particular for the purpose of modifying stop position S, while maintaining track or heading, depending on the longitudinal speed $U_X$ of the aircraft.

Whatever the mode of operation of the control members and the autopilot, the first and second control levers can be used as being respectively the first and second control members, the first control member then having the first movement axis A and the second movement axis B, and the second control member having the third movement axis C. These first and second levers thus enable the aircraft to be piloted while maintaining track or heading as the case may be while using the method of the invention and by means of the autopilot.

Nevertheless, such particular utilization of control levers is not appropriate for performing a sudden maneuver of the aircraft, e.g. for the purpose of avoiding an obstacle that lies on the track $T_{sol}$ of the aircraft or close to it. The first and second control levers in this particular utilization do not enable the aircraft to make a vertical or lateral movement rapidly.

A sudden obstacle-avoiding maneuver is generally performed solely by moving in rotation about the pitching axis, i.e. by using the first control lever so as to perform a vertical movement. However such a maneuver about the pitching axis, as obtained by longitudinal variation of the cyclic pitch, can be accompanied by the pilot acting on the second control lever thus leading also to a variation in the collective pitch.

A violent action of the pilot on at least one of the first and second control levers, and preferably on the first control lever only, leads to the autopilot acting to deactivate maintenance of the flight path angle P setpoint or of the vertical speed $W_Z$ setpoint, where appropriate. As a result, the pilot can control the longitudinal cyclic pitch so as to act on the aircraft and make it move in rotation about the pitching axis and possibly also so as to act on the collective pitch so as to make the aircraft move in translation along the elevation direction Z and thus perform the needed avoidance maneuver. Such an avoidance maneuver is mainly performed in forward flight while maintaining track.

Under such circumstances, when flying while maintaining heading, in particular during flight stages close to hovering flight, it is not necessary to identify a violent action of the pilot on any of the control levers. The actions that are allocated to the first and second control levers are allocated in non-ambiguous manner, a longitudinal action on the first control lever having an effect essentially on the longitudinal speed of the aircraft and an action on the second control lever having an effect essentially on its vertical speed.

For example, after such a sudden action of the pilot has been detected, the pilot can, by transparency, control the pitching of the aircraft by using the first control lever so as to cause the aircraft to move in rotation about the transverse direction Y. The flight path angle P is then no longer considered to be a flight setpoint for maintaining track and thus is not controlled by the autopilot in order to avoid countering the avoidance maneuver. Furthermore, the collective pitch remains constant except for pilot action by transparency on the second control lever in order to cause the aircraft to move in translation along the elevation direction Z.

The term "violent" action is used to mean an action of large amplitude of the pilot of the aircraft on either one of the two control levers. Such a large amplitude action can be considered as the pilot making a request to avoid an obstacle, given that piloting for maintaining track or for maintaining heading is performed by small amplitude movements in order to obtain modification to the track $T_{sol}$.

Furthermore, the system for engaging hovering flight may include control members that are dedicated to piloting the aircraft by transparency while it is maintaining track or maintaining heading along the track $T_{sol}$ by means of the method of the invention and the autopilot.

The system for engaging hovering flight may for example include a first control member positioned on the first control lever and a second control member positioned on the second control lever. The first control member has the first movement axis A and the second movement axis B, while the second control member has the third movement axis C and possibly the fourth movement axis D.

The system for engaging hovering flight thus has two control members operating jointly relative to at least three movement axes A, B, C and possibly four movement axes A, B, C, D. A first control member is provided with two movement axes A, B and a second control member is provided with one or two movement axes C, D.

Such control members are generally calibrated and thus control precise and predetermined movements of the aircraft. Thus, regardless of the mode of operation of the control members and of the autopilot, when the pilot acts on one of the control members by exerting a continuous press relative to a movement axis A, B, C, D, then the stop position S is moved and one of the parameters of the track $T_{sol}$ is varied by a predetermined value. Such control members are often referred to as "beeps".

For example, when the aircraft is maintaining track, pressing continuously on a control member relative to the movement axis A causes the deceleration rate Ga of the forward speed Va of the aircraft to increase or decrease along the track $T_{sol}$ by a predetermined value so long as the press is maintained, thereby moving the stop position S along the track $T_{sol}$. Thereafter, when the control member is released by the pilot relative to the movement axis A, the autopilot synchronizes its flight setpoints on the new deceleration rate $Ga_n$ for the forward speed Va, maintaining a decreasing forward speed Va for the aircraft until it reaches the new stop position $S_n$. By way of example, the predetermined value for the variation in this deceleration rate Ga of the forward speed Va may be 0.14 m/s² per second (m/s²).

Likewise, when pressing continuously on a control member relative to the movement axis B or C, the ground course angle $TK_{sol}$ of the aircraft typically varies at a rate of 3 degrees per second (3°/s) so long as this continuous press is maintained, thereby moving the stop position S in a plane. Thereafter, when the control member is released by the pilot relative to the movement axis B or D, the autopilot synchronizes its flight setpoints on the new ground course angle $TK_{soln}$ of the aircraft in order to follow a new track $T_{soln}$ so as to reach the new stop position $S_n$.

Finally, when pressing continuously on a control member relative to the movement axis C, the flight path angle P of the aircraft varies at a rate of 0.3% per second (%/s) so long as this continuous press is maintained, thereby modifying the altitude of the stop position S. Thereafter, when the control member is released by the pilot relative to the movement axis C, the autopilot synchronizes its flight setpoints on the new flight path angle $P_n$ of the aircraft in order to follow a new track $T_{sol}$ so as to reach the new stop position $S_n$.

In contrast, when the aircraft is traveling in the second mode of operation of the method of the invention for the control members and for the autopilot, the effects of the control members may be different.

When the aircraft is maintaining heading, then a continuous press on the control member relative to the movement axis A causes the aircraft to accelerate or decelerate longitudinally at 1.5 knots per second (kt/s) so long as the continuous press is maintained, thereby moving the stop position S longitudinally. Thereafter, when the control member is released by the pilot relative to the movement axis A, the autopilot synchronizes its flight setpoints on the new longitudinal speed $U_{Xn}$ of the aircraft which is decreasing in order to reach the new stop position $S_n$.

Likewise, while a control member is being pressed continuously relative to the movement axis B, the aircraft accelerates or decelerates laterally by 1.5 kt/s so long as this continuous press is maintained, thereby moving the stop position S laterally. Thereafter, when the control member is released by the pilot relative to the movement axis B, the autopilot synchronizes its flight setpoints on the new lateral speed $V_{Yn}$ of the aircraft, which is decreasing in order to reach the new stop position $S_n$.

Furthermore, on a control member being pressed continuously relative to the movement axis C, the aircraft accelerates or decelerates vertically by 150 feet per minute (ft/min) so long as the continuous press is maintained, thereby moving the stop position S vertically. Thereafter, when this control member is released by the pilot relative to the movement axis C, the autopilot synchronizes its flight setpoints on the new vertical speed $W_Z$, which is decreasing in order to reach the new stop position $S_n$.

In addition, when a control member is subjected to a continuous press relative to the movement axis D, the aircraft turns about its yaw axis at an angular speed of 3 degrees per second (°/s). If this continuous press is maintained for more than 3 s, the aircraft then turns about its yaw axis at an angular speed of 10°/s so long as the press is maintained. Thereafter, when the control member is released by the pilot relative to the movement axis D, the autopilot synchronizes its flight setpoints on the new heading $\Psi_n$ of the aircraft, with the stop position optionally being modified if at least one longitudinal or lateral speed $U_X$ or $V_Y$ of the aircraft is not zero.

In addition, a tap on a control member relative to the movement axis A causes the stop position S to be shifted longitudinally by 1 meter (m). Likewise, a tap on a control member relative to the movement axis B causes the stop position S to be shifted laterally by 1 m or else causes the aircraft to be shifted laterally by 1 m if it is hovering, and a tap on a control member relative to the movement axis C causes the stop position S to be shifted vertically by 1 ft.

By way of example, it is considered that a press on a control member is continuous once the press is maintained for a duration of at least 1 s. A tap on the control member then corresponds to pressing for a duration of less than 1 s.

The present invention also provides a system for engaging hovering flight of a rotary wing aircraft while maintaining track or while maintaining heading for a rotary wing aircraft, the system for engaging hovering flight including at least one control member provided jointly with a plurality of movement axes A, B, C, D, and an autopilot for generating command orders in predefined modes of operation and in compliance with flight setpoints.

The system for engaging hovering flight of the aircraft may also include a first control lever enabling the cyclic pitch of the main blades of a main rotor of the aircraft to be modified and a second control lever enabling the collective pitch of the main blades of the main rotor to be modified. The first control lever has two movement axes and makes it possible in particular to control movements in rotation of the aircraft about longitudinal and transverse directions X and Y. The second control lever has a single movement axis and serves in particular to control movements in translation of the aircraft in the elevation direction Z.

The system for engaging hovering flight may thus perform the above-described method of engaging hovering flight while maintaining track or while maintaining heading.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which.

DETAILED DESCRIPTION OF THE INVENTION

Figure 1:
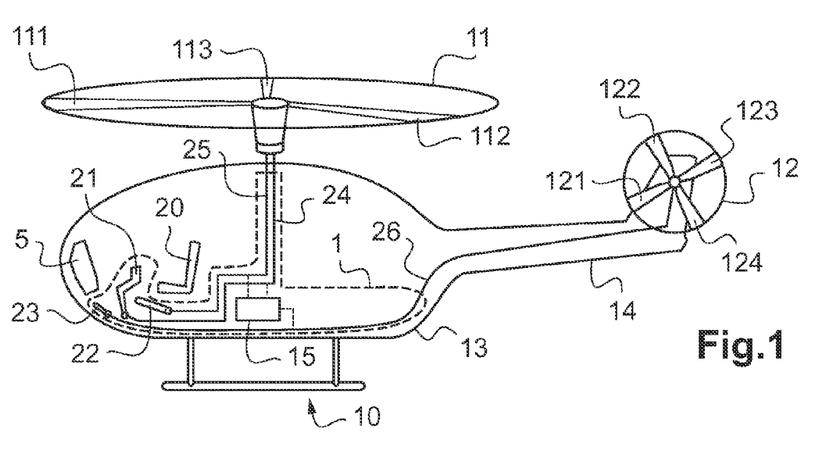
FIG. 1 shows an aircraft having flight control of the invention.

In FIG. 1, there can be seen an aircraft 10 that has a main rotor 11 positioned above a fuselage 13 and an anti-torque tail rotor 12 positioned at the tail end of a tail boom 14. The aircraft 10 also has an instrument panel 5, a seat 20 on which a pilot of the aircraft 10 can sit, an autopilot 15, and manual control means made up in particular of two control levers 21 and 22, and of pedals 23.

Furthermore, an X, Y, Z reference frame is attached to the aircraft 10, and more particularly to its center of gravity. The longitudinal direction X extends from the rear of the aircraft to the front of the aircraft 10, the elevation direction Z extends upwards perpendicularly to the longitudinal direction X, and the transverse direction Y extends from left to right perpendicularly to the longitudinal and elevation directions X and Y.

The longitudinal direction X is the roll axis of the aircraft 10, the transverse direction Y is its pitching axis, and the elevation direction Z is its yaw axis.

The main rotor 11 has an axis of rotation that is substantially vertical, i.e. parallel to the elevation direction Z, and it is provided with three main blades 111, 112, 113 having collective pitch and cyclic pitch that are variable under the control of the control levers 21, 22 and of the autopilot 15. In similar manner, the tail rotor 12 has its axis of rotation substantially horizontal, i.e. parallel to the transverse direction Y, and it is provided with four secondary blades 121, 122, 123, 124 of collective pitch that is variable and controllable by means of the pedals 23 and of the autopilot 15.

More precisely, the first control lever 21 is movable about the longitudinal and transverse directions X and Y and serves to control the cyclic pitch of the main blades 111, 112, 113 by means of a first control linkage 24. The second control lever 22 is movable about the transverse direction Y and controls the collective pitch of the main blades 111, 112, 113 by means of a second control linkage 25. Taking action on the first control lever 21 then serves to control movements in rotation of the aircraft 10 about the longitudinal and transverse directions X and Y, and taking action on the second control lever then serves to control movements in translation of the aircraft 10 along the elevation direction Z.

Likewise, the pedals 23 control the collective pitch of the secondary blades 121, 122, 123, 124 via a third control linkage 26. Taking action on the pedals 23 then serves to control movements in rotation of the aircraft 10 about its yaw axis.

The control linkages 24, 25, 26 serve to actuate the various blades and may for example be made up of connections that are entirely mechanical between the manual control means 21, 22, 23 and the blades. These control linkages 24, 25, 26 may also be made up of mechanical connections associated with hydraulic actuator means, or indeed electrical connections associated with such hydraulic actuator means.

The autopilot 15 also serves to control the collective and cyclic pitches of the main blades 111, 112, 113, and also the collective pitch of the secondary blades 121, 122, 123, 124 by acting respectively on the same control linkages 24, 25, 26. The autopilot 15 then serves to control movements in rotation of the aircraft 10 about the longitudinal and transverse directions X and Y and movements in translation of the aircraft 10 along the elevation direction Z, and also movements in rotation of the aircraft 10 about its yaw axis.

Figure 3:
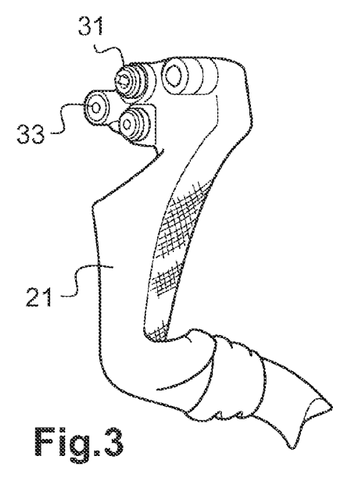
FIGS. 3 and 4 are two detail views of control levers of a rotary wing aircraft.
Figure 4:
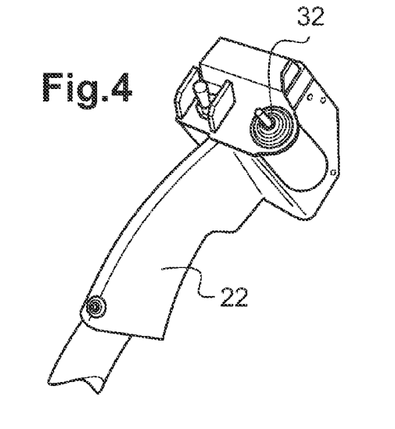

FIGS. 3 and 4 show in greater detail the respective grip zones of the first and second control levers 21 and 22. The grip zone of each control lever 21, 22 includes in particular a respective control member 31, 32 and a pushbutton 33. Each control member 31, 32 is movable about two specific movement axes A & B, C & D. A first control member 31 present on the first control lever 21 and shown in FIG. 3 is movable about two movement axes A and B. In similar manner, a second control member 32 present on the second control lever 22 and shown in FIG. 4 is movable about two movement axes C and D.

A system 1 for engaging hovering flight is made up of manual control means 21, 22, 23, of the control members 31, 32, of the pushbutton 33, of the autopilot 15, and of the control linkages 24, 25, 26.

The aircraft 10 can fly along a track $T_{sol}$ relative to the ground, this track $T_{sol}$ being determined relative to the ground and defined in a terrestrial geographical reference frame, e.g. determined by the cardinal points and the direction of terrestrial gravity.

A flight of an aircraft 10 along the track $T_{sol}$ may be characterized using two types of characterization by using different parameters for the track $T_{sol}$.

In a first type of characterization, a flight of an aircraft 10 along the track $T_{sol}$ is characterized by a ground course angle $TK_{sol}$ between the direction of the track $T_{sol}$ and the direction of north in a horizontal plane of the terrestrial geographical reference frame, a forward speed Va of the aircraft 10, a flight path angle P formed by the angle between the direction of the track $T_{sol}$ and the horizontal orientation of the terrestrial reference frame, and a heading $\Psi$ which is the angle formed between the direction of north and the projection of the longitudinal direction X of the aircraft10 onto a horizontal plane of the terrestrial reference frame.

The forward speed Va of the aircraft 10 is the speed of the aircraft 10 along the direction of the track $T_{sol}$, and this speed may be defined relative to the ground or else relative to the air. In addition, this forward speed Va may vary in application of an acceleration or deceleration rate Ga that also makes it possible to characterize the track $T_{sol}$ instead of and taking the place of the forward speed Va in this first type of characterization.

In a second type of characterization, a flight of an aircraft 10 along the track $T_{sol}$ is characterized by a longitudinal speed $U_X$ along the longitudinal direction X, a lateral speed $V_Y$ along the transverse direction Y, and a vertical speed $W_Z$ along the elevation direction Z, and also by the heading $\Psi$.

These longitudinal, lateral, and vertical speeds, $U_X$, $V_Y$, and $W_Z$ are respective components of the forward speed Va of the aircraft 10 along the three specified directions X, Y, Z of the aircraft 10.

Figure 2:
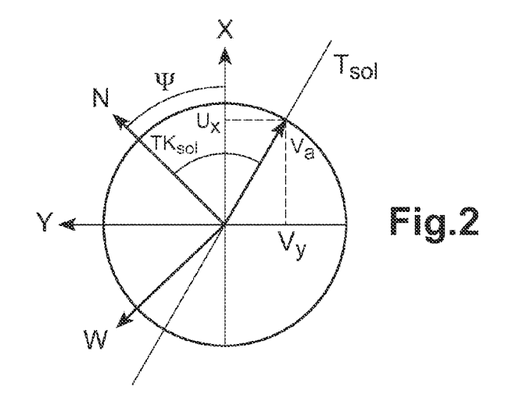
FIG. 2 is a diagram showing the ground course angle and the heading of the aircraft.

FIG. 2 shows a projection onto a horizontal plane of the terrestrial reference frame of a track $T_{sol}$. The longitudinal and transverse directions X, Y of the aircraft 10 are also shown as are the directions N, W of a terrestrial geographical reference frame.

The heading $\Psi$ is thus shown between the longitudinal direction X of the aircraft 10 and the direction N of north. The course angle $TK_{sol}$ on the ground is shown between the direction of the track $T_{sol}$ and the direction N of north.

It can be seen that the heading $\Psi$ is different from the ground course angle $TK_{sol}$. Consequently, the nose and the tail boom 14 of the aircraft 10, which are in alignment on the longitudinal direction X, are not in alignment with the track $T_{sol}$. Likewise, the forward speed Va is in alignment with the track $T_{sol}$ and is not parallel to the longitudinal direction X.

In addition, the longitudinal and lateral speeds $U_X$ and $V_Y$ are respective projections of the forward speed Va of the aircraft 10, and preferably of the forward speed of the aircraft 10 relative to the ground, onto the longitudinal and transverse directions X and Y. The vertical speed $W_Z$ and also the flight path angle P are not shown in FIG. 2, which lies in a horizontal plane of the terrestrial reference frame, and thus extends perpendicularly to the elevation direction Z.

The aircraft 10 travels generally along a track $T_{sol}$ in order to reach a target on the ground, such as a landing ground or else a target position for hovering. Nevertheless, depending on the flight conditions of the aircraft 10, and in particular on its longitudinal speed $U_X$, the maneuvers performed by the pilot are different. When the aircraft 10 is traveling at a low longitudinal speed $U_X$, the piloting of the aircraft 10 is generally performed by maintaining heading, with the pilot acting on the parameters of the track $T_{sol}$ in the second type of characterization. Under such circumstances, the pilot acts directly to control the longitudinal, lateral, and vertical speeds $U_X$, $V_Y$, and $W_Z$, and also the heading $\Psi$ of the aircraft 10, e.g. so as to move at very low longitudinal speeds $U_X$ and at low altitude close to buildings.

In contrast, when the aircraft 10 is traveling at a faster longitudinal speed $U_X$, the piloting of the aircraft 10 is generally performed by maintaining track, with the pilot acting on the parameters of the track $T_{sol}$ in the first type of characterization. Under such circumstances, the pilot prefers to control the forward speed Va of the aircraft 10 directly along the track $T_{sol}$ so as to slow down or accelerate the aircraft 10, and to control the ground course angle $TK_{sol}$ so as to modify said track $T_{sol}$, and also to control the flight path angle P and possibly the heading $\Psi$.

Nevertheless, travel of the aircraft 10 at a flight path angle P is meaningful only above a certain forward speed, which is of the order of 20 kt. When the forward speed Va of the aircraft 10 is less than a third threshold speed $V_{thresh3}$, while in the speed range for maintaining track, the pilot of the aircraft 10 controls the vertical speed $W_Z$ of the aircraft 10 instead of the flight path angle P. The flight setpoint expressed in terms of flight path angle P is replaced by a flight setpoint expressed in terms of the vertical speed $W_Z$ of the aircraft 10.

The system 1 for engaging hovering flight of the aircraft may perform a method for engaging hovering flight while maintaining track or while maintaining heading that makes it possible automatically to engage the aircraft 10 in hovering flight at a stop position S when in flight while maintaining track or maintaining heading as a function of the longitudinal speed $U_X$ of the aircraft 10. This method of engaging hovering flight is applied by means of the button 33, e.g. by the pilot pressing this button 33 once or twice.

Thus, this method for engaging hovering flight makes it possible, as a function of the longitudinal speed $U_X$ of the aircraft 10, to changeover between a first mode of operation for the control members 31, 32 and the autopilot 15 in the first type of characterization of the track $T_{sol}$, and a second mode of operation of the control members 31, 32 and the autopilot 15 in the second type of characterization of the track $T_{sol}$. This second mode of operation of the control members 31, 32 and of the autopilot 15 is thus used at low longitudinal speeds $U_X$, with the first mode of operation being used at higher longitudinal speeds $U_X$.

During this first mode of operation of the control members 31, 32 and of the autopilot 15, the autopilot 15 enables the aircraft 10 to engage hovering flight at a stop position S, with the flight setpoints of the autopilot 15 being the ground course angle $TK_{sol}$, the deceleration rate Ga for the forward speed Va, the flight path angle P or else the vertical speed $W_Z$, as appropriate, and the heading $\Psi$. In contrast, in the second mode of operation of the control members 31, 32 and of the autopilot 15, the autopilot 15 enables the aircraft 10 to engage hovering flight at the stop position S with the flight setpoints of the autopilot 15 being the longitudinal speed $U_X$, the lateral speed $V_Y$, and the vertical speed $W_Z$, each of these three speeds $U_X$, $V_Y$, and $W_Z$ being brought progressively to a value of zero, and the heading $\Psi$.

The stop position S is determined when the pilot applies the method of the invention for engaging hovering flight. This stop position S is aligned on the track $T_{sol}$ followed by the aircraft 10 and is determined as a function of the parameters of this track $T_{sol}$ and also of a predetermined deceleration rate.

Thus, in this first mode of operation of the control members 31, 32 and of the autopilot 15, the forward speed Va decreases in application of the deceleration rate Ga enabling flight maintaining track to be performed towards the stop position S. In addition, the flight setpoint corresponding to the flight path angle P must also vary so that the aircraft 10 approaches this stop position S along a constant flight path angle followed by a curved path so that the aircraft 10 is flying level on reaching the stop position S.

Likewise, during the second mode of operation of the control members 31, 32 and of the autopilot 15, the flight setpoints corresponding to the longitudinal, lateral, and vertical speeds $U_X$, $V_Y$, and $W_Z$ are also decreasing in application of a deceleration rate enabling flight while maintaining heading to be performed until hovering flight is engaged at the stop position S.

The changeover between the first and second modes of operation of the control members 31, 32 and of the autopilot 15 takes place relative to a hysteresis threshold using two threshold speeds $V_{thresh1}$ and $V_{thresh2}$, the first threshold speed $V_{thresh1}$ being higher than the second threshold speed $V_{thresh2}$.

The threshold speeds $V_{thresh1}$ and $V_{thresh2}$ may be functions of the flying conditions of the aircraft 10, and essentially of the speed and direction of the wind and also of the lateral speed $V_Y$ of the aircraft 10.

In addition, during these two modes of operation of the control members 31, 32 and of the autopilot 15, piloting is possible by transparency in order to modify the position of the stop position S and possibly also to adjust the track $T_{sol}$. Such modifications are necessary in particular when flying at sight and at low altitude and as a function of the surroundings and/or of weather conditions.

Thus, the pilot may act directly to cause this stop position S to be shifted so as to make it coincide with the target position for hovering by modifying one or more parameters of the track $T_{sol}$ by means of the control members 31, 32 and by means of the autopilot 15.

This method of engaging hovering flight makes it possible, in this first mode of operation of the control members 31, 32 and of the autopilot 15, for the aircraft 10 to approach a stop position S while maintaining track $T_{sol}$ by modifying the deceleration rate Ga for the forward speed Va, the ground course angle $TK_{sol}$, the flight path angle P or else the vertical speed $W_Z$ as appropriate, and possibly also the heading $\Psi$, thereby causing the stop position S to be moved by means of the control members 31, 32 and by means of the autopilot 15 acting on the various flight parameters.

Likewise, the method for engaging hovering flight makes it possible during this second mode of operation of the control members 31, 32 and of the autopilot 15 to engage in hovering flight while maintaining heading towards the stop position S by modifying the longitudinal speed $U_X$, the lateral speed $V_Y$, the vertical speed $W_Z$, and the heading $\Psi$, thereby moving the stop position S by means of the control members 31, 32 and by means of the autopilot 15 acting on the various flight parameters.

Each action taken by the pilot on one of the control members 31, 32 relative to a movement axis A, B, C, D acts by means of the autopilot 15 to modify the stop position S.

Thus, while maintaining track, an action of the pilot on one of the control members 31, 32 relative to the movement axis A, B, C leads to the stop position S being moved horizontally along the track $T_{sol}$ without changing the distance between the current position of the aircraft 10 and the stop position S, and vertically by modifying the deceleration rate Ga for the forward speed Va, the ground course angle $TK_{sol}$, and the flight path angle P or else the vertical speed $W_Z$, as appropriate. Furthermore, the stop position S may also be moved horizontally without changing the distance between the current position of the aircraft 10 and the stop position S by modifying the ground course angle $TK_{sol}$ by the pilot acting on one of the control members 31, 32 relative to the movement axis B. The heading $\Psi$ may be modified by the pilot acting on the pedals 23, but without any direct effect on the stop position S.

In contrast, while maintaining heading, an action of the pilot on one of the control members 31, 32 relative to the movement axis A, B, C, D leads to the stop position S being moved along the specified directions X, Y, Z by modifying respectively the longitudinal speed $U_X$, the lateral speed $V_Y$, and the vertical speed $W_Z$, and the heading $\Psi$.

Naturally, the pilot can act simultaneously on one or both control members 31, 32 and relative to a plurality of movement axes A, B, C, D in order to generate movements of the stop position in several directions by modifying several parameters of the track $T_{sol}$.

The autopilot 15 takes account of the actions of the pilot on the control members 31, 32, it modifies its flight setpoints as a function of these actions, and it then generates command orders in order to modify the pitch of the main blades 111, 112, 113 of the main rotor 11 and possibly the pitch of the secondary blades 121, 122, 123, 124 of the tail rotor 12. The aircraft 10 then follows a new track $T_{soln}$, having one or more parameters that have been modified as requested by the pilot, so as to engage in hovering flight at a new stop position $S_n$, these modified parameters being the new flight setpoints of the autopilot 15.

During each action of the pilot on the control members 31, 32, new flight setpoints of the autopilot 15 can be synchronized on the parameters of the new track $T_{soln}$ and in order to reach the new stop position $S_n$. The parameters of the new track $T_{soln}$ are a new ground course angle $TK_{soln}$, a new deceleration rate Ga for the forward speed $Va_n$, a new flight path angle $P_n$, and/or a new heading $\Psi_n$ in the first mode of operation of the control members 31, 32 and of the autopilot 15, and a new longitudinal speed $U_{Xn}$, a new lateral speed $V_{Yn}$ a new vertical speed $W_{Zn}$, and/or a new heading $\Psi_n$ during the second mode of operation of the control members 31, 32 and of the autopilot 15.

In addition, the first control lever 21 may be used as the first control member 31 and the second control lever 22 is used as the second control member 32.

Nevertheless, such particular utilization of the control levers 21 and 22 is not suitable for performing urgently a sudden maneuver of the aircraft 10, e.g. for the purpose of avoiding an obstacle to be found on the track $T_{sol}$ or indeed close thereto. The first and second control levers 21, 22 then do not enable a vertical lateral movement of the aircraft 10 to be performed quickly.

Maintaining the setpoint for the flight path angle P or for the vertical speed $W_Z$, as appropriate, by means of the autopilot 15 is deactivated as soon as it is detected that the pilot is acting violently on the first control lever 21 in forward flight while maintaining track. Consequently, the pilot can control the longitudinal cyclic pitch so as to make the aircraft 10 move in rotation about the pitching axis, and the pilot may possibly act on the collective pitch in order to cause the aircraft 10 to move in translation along the elevation direction Z and thus perform the necessary avoidance maneuver.

Naturally, the present invention may be subjected to numerous variations as to its implementation. Although several embodiments are described, it will readily be understood that it is not conceivable to identify exhaustively all possible implementations. It is naturally possible to envisage replacing any of the means described by equivalent means without going beyond the ambit of the present invention.

In particular, the aircraft 10 with this system 1 for engaging hovering flight is not limited to the aircraft 10 shown in FIG. 1. By way of example, the aircraft 10 may have two main rotors or it may be a hybrid helicopter.

Furthermore, the number of main blades 111, 112, 113 of a main rotor 11, and the number of secondary blades 121, 122, 123, 124 of a tail rotor 12 are not limited to the example aircraft 10 shown in FIG. 1. A main rotor 11 or a tail rotor 12 may have two, three, four, five, or even more than five blades.

What is claimed is:

1. A method for engaging hovering flight for a rotary wing aircraft, the aircraft following a track $T_{sol}$ relative to the ground with a forward speed Va, a longitudinal direction X extending from the rear of the aircraft to the front of the aircraft, an elevation direction Z extending upwards perpendicularly to the longitudinal direction X, and a transverse direction Y extending from left to right perpendicularly to the longitudinal and elevation directions X and Z, the aircraft comprising:

at least one rotary wing having a plurality of main blades of collective pitch and cyclic pitch that are variable about respective pitch axes, the aircraft being capable of performing movements in rotation about the directions X, Y, Z and of performing movements in translation along the directions X, Y, Z;

an autopilot that generates control signals in predefined modes of operations and in application of flight setpoints, the control signals being capable of causing the aircraft to perform the movements in rotation and/or in translation relative to the directions X, Y, Z; and flight controls having at least one control member provided jointly with a plurality of movement axes A, B, C, D;

the method comprising the following steps:

applying a first mode of operation of the control members and of the autopilot when a longitudinal speed $U_X$ of the aircraft is greater than a first threshold speed $V_{thresh1}$, the longitudinal speed $U_X$ being a projection of the forward speed Va onto the longitudinal direction X, the autopilot then enabling the aircraft to approach a determined stop position S when the method is being applied while maintaining track, the flight setpoints of the autopilot being a ground course angle $TK_{sol}$, a deceleration rate Ga of the forward speed Va, a flight path angle P, and a heading Ψ; and applying a second mode of operation for the control members and the autopilot when the longitudinal speed $U_X$ is less than a second threshold speed $V_{thresh2}$, the first threshold speed $V_{thresh1}$ being greater than the second threshold speed $V_{thresh2}$, the autopilot then enabling the aircraft to engage hovering flight while maintaining heading towards this stop position S, the flight setpoints of the autopilot being the longitudinal speed $U_X$, a lateral speed $V_Y$ and a vertical speed $W_Z$, and a heading Ψ, each of the longitudinal, lateral, and vertical speeds $U_X$, $V_Y$, $W_Z$ varying towards zero speed.

2. A method according to claim 1 for engaging hovering flight for a rotary wing aircraft, wherein:

the first mode of operation of the control members and of the autopilot remains engaged so long as the longitudinal speed $U_X$ is greater than or equal to the second threshold speed $V_{thresh2}$; and the second mode of operation of the control members and of the autopilot remains engaged so long as the longitudinal speed $U_X$ is less than or equal to the first threshold speed $V_{thresh1}$.

3. A method according to claim 1 for engaging hovering flight for a rotary wing aircraft, wherein during the first mode of operation of the control members and of the autopilot:

it is possible, independently and by transparency for the purpose of defining a new stop position $S_n$ of the aircraft, to cause a modification of:

the deceleration rate Ga for the forward speed Va by taking a first action on a first movement axis A of a control member and by means of the autopilot generating a shift of the stop position S on the track $T_{sol}$;

the ground course angle $TK_{sol}$ by taking a second action on a second movement axis B of a control member and by means of the autopilot generating a shift of the stop position S in a horizontal plane; and/or the flight path angle P by taking a third action on a third movement axis C of a control member and by means of the autopilot generating a modification in the altitude of the stop position S; and to synchronize the flight setpoints of the autopilot so as to approach the new stop position $S_n$ while maintaining track, the flight setpoints including amongst others a new ground course angle $TK_{soln}$, a new deceleration rate $Ga_n$ for the forward speed Va, a new flight path angle $P_n$, and/or a new heading $Ψ_n$.

4. A method according to claim 3 for engaging hovering flight for a rotary wing aircraft, wherein during the first mode of operation of the control members and of the autopilot:

it is possible, by transparency, to cause a modification of the ground course angle $TK_{sol}$ by taking a fourth action on a fourth movement axis D of a control member and by means of the autopilot generating a movement of the stop position S in a horizontal plane in order to define a new stop position $S_n$ without modifying the deceleration rate Ga for the forward speed Va and the flight path angle P; and to synchronize the flight setpoints of the autopilot are synchronized in order to approach the new stop position $S_n$ while maintaining track, the flight setpoints including amongst others a new ground course angle $TK_{soln}$.

5. A method according to claim 1 for engaging hovering flight for a rotary wing aircraft, wherein during the first mode of operation of the control members and of the autopilot, the deceleration rate Ga for the forward speed Va lies in a predefined range.

6. A method according to claim 1 for engaging hovering flight for a rotary wing aircraft, wherein if the forward speed Va is less than a third threshold speed $V_{thresh3}$, the flight path angle P is replaced by the vertical speed $W_Z$ as the flight setpoint for the autopilot during the first mode of operation of the control members and of the autopilot.

7. A method according to claim 1 for engaging hovering flight for a rotary wing aircraft, wherein during the second mode of operation of the control members and of the autopilot:

it is possible, independently and by transparency for the purpose of defining a new stop position $S_n$ of the aircraft, to cause a modification of:

the longitudinal speed $U_X$ by taking a first action on a first movement axis A of a control member and by means of the autopilot generating a longitudinal shift of the stop position S;

the lateral speed $V_Y$ by taking a second action on a second movement axis B of a control member and by means of the autopilot generating a lateral shift of the stop position S; and/or the vertical speed $W_Z$ by taking a third action on a third movement axis C of a control member and by means of the autopilot generating a vertical shift of the stop position S; and to synchronize the flight setpoints of the autopilot in order to engage hovering flight towards the new stop position $S_n$ while maintaining heading, the flight setpoints including amongst other things a new longitudinal speed $U_{Xn}$, a lateral speed $V_Y$, and/or a vertical speed $W_Z$ decreasing towards a value zero.

8. A method according to claim 1 for engaging hovering flight for a rotary wing aircraft, wherein during the second mode of operation of the control members and of the autopilot:

it is possible, independently and by transparency for the purpose of defining a new stop position $S_n$ of the aircraft, to cause a modification of:

a longitudinal shift of the stop position S by a first action on a first movement axis A of a control member and by means of the autopilot;

a lateral shift of the stop position S by a second action on a second movement axis B of a control member and by means of the autopilot; and/or a vertical shift of the stop position S by a third action on a third movement axis C of a control member and by means of the autopilot; and to synchronize the flight setpoints of the autopilot in order to engage hovering flight towards the new stop position $S_n$ while maintaining heading, the flight setpoints including amongst other things a new longitudinal speed $U_{Xn}$, a lateral speed $V_Y$, and/or a vertical speed $W_Z$ decreasing towards a value zero.

9. A method according to claim 7 for engaging hovering flight for a rotary wing aircraft, wherein during the second mode of operation of the control members and of the autopilot:

it is possible, by transparency, to cause a change of heading Ψ by a fourth action on a fourth movement axis D of a control member and by means of the autopilot independently of the speeds $U_X$, $V_Y$, $W_Z$, and possibly leading to a shift of the stop position S; and to synchronize the flight autopilots of the autopilot in order to engage hovering flight towards the stop position S while maintaining heading, the flight setpoints including amongst other things a new heading $\Psi_n$.

10. A method according to claim 1, for engaging hovering flight for a rotary wing aircraft, wherein the aircraft has firstly a first control lever for controlling movements in rotation of the aircraft about the longitudinal and transverse directions X and Y, and secondly a second control lever for controlling movements of the aircraft in translation along the elevation direction Z, and a first control member is the first control lever, and a second control member is the second control lever, the first control member having the first movement axis A and the second movement axis B, the second control member having the third movement axis C.

11. A method according to claim for engaging hovering flight for a rotary wing aircraft, wherein a violent action on the first control lever causes the autopilot to deactivate maintaining the flight path angle setpoint P, the first control lever then controlling movements in rotation of the aircraft about the longitudinal direction X, and the second control lever controlling movements in translation of the aircraft along the elevation direction Z.

12. A method according to claim 1 for engaging hovering flight for a rotary wing aircraft, wherein the aircraft has firstly a first control lever for controlling movements in rotation of the aircraft about the longitudinal and transverse directions X and Y, and secondly a second control lever enabling movements of the aircraft in translation to be controlled along the elevation direction Z, and a first control member is positioned on the first control lever and a second control member is positioned on the second control lever, the first control member having the first movement axis A and the second movement axis B, and the second control member having the third movement axis C.

13. A method according to claim 12 for engaging hovering flight for a rotary wing aircraft, wherein the second control member has a fourth movement axis D.

14. A method according to claim 1 for engaging hovering flight for a rotary wing aircraft, wherein the control members are calibrated and control precise movements of the aircraft.

15. A method according to claim 1 for engaging hovering flight for a rotary wing aircraft, wherein the first and second threshold speeds $V_{thresh1}$, $V_{thresh2}$ are a function of the speed and the direction of the wind and also of the lateral speed $V_Y$.

16. A system for engaging hovering flight for a rotary wing aircraft, the aircraft following a track $T_{sol}$ relative to the ground with a forward speed Va:
the aircraft comprising:
a longitudinal direction X extending from the front of the aircraft towards the rear of the aircraft, an elevation direction Z extending upwards perpendicularly to the longitudinal direction X, and a transverse direction Y extending from right to left perpendicularly to the longitudinal and elevation directions X and Z; and
at least one rotary wing having a plurality of main blades with collective pitch and cyclic pitch that are variable about respective pitch axes, the aircraft being capable of performing movements in rotation about the directions X, Y, Z and movements in translation along the directions X, Y, Z; and
the system for engaging hovering flight comprising:
at least one control member provided jointly with a plurality of movement axes A, B, C, D; and
an autopilot generating command orders in predefined modes of operation, the command orders being suitable for causing the movements of the aircraft in rotation and/or in translation relative to the directions X, Y, Z;
wherein the system for engaging hovering flight is capable of performing the method according to claim 1 for engaging hovering flight for a rotary wing aircraft.

* * * * *